Aug. 22, 1972     T. A. STEHLIN     3,686,092
WATER TREATMENT APPARATUS
Filed May 6, 1971
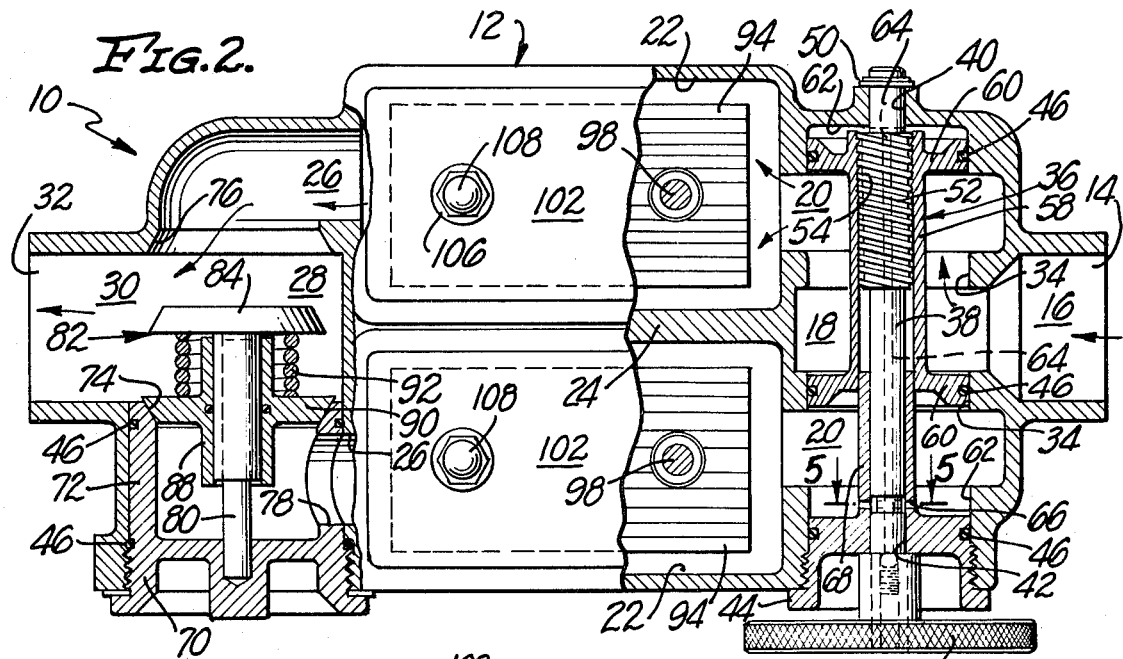
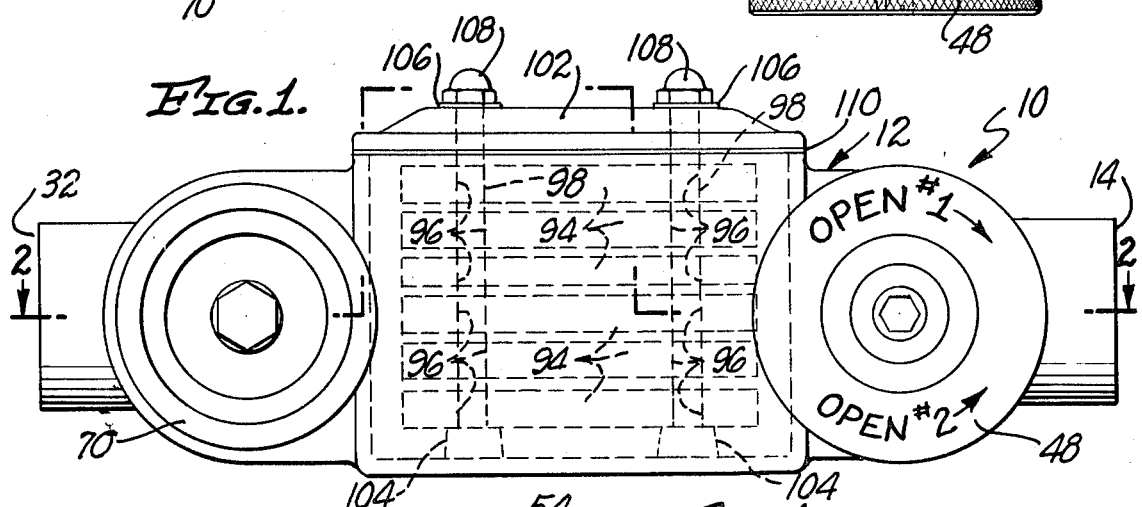
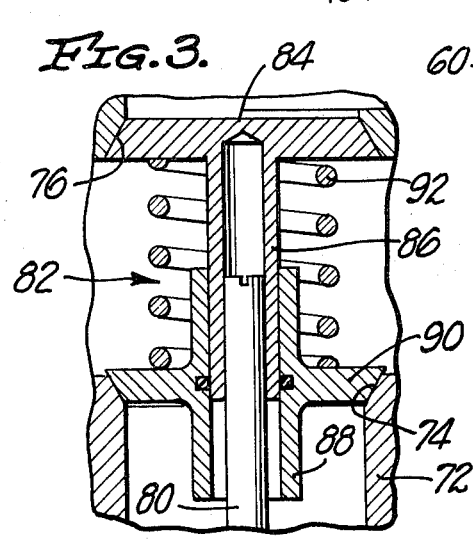
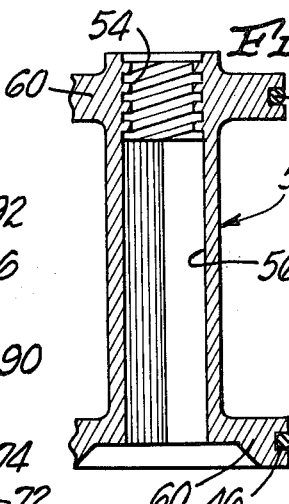
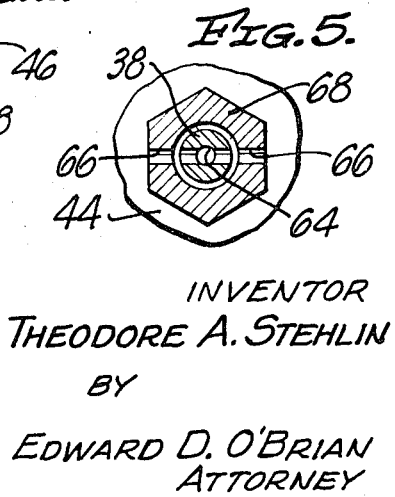
INVENTOR
THEODORE A. STEHLIN
BY
EDWARD D. O'BRIAN
ATTORNEY

United States Patent Office 3,686,092
Patented Aug. 22, 1972

3,686,092
WATER TREATMENT APPARATUS
Theodore A. Stehlin, Pasadena, Calif., assignor to
Helen B. Hoffman, Laguna Beach, Calif.
Filed May 6, 1971, Ser. No. 140,874
Int. Cl. C23f 13/00
U.S. Cl. 204—197                                    10 Claims

ABSTRACT OF THE DISCLOSURE

A water treatment apparatus for so-called self-energizing electrolytic water treatment can be constructed utilizing an iron housing having an inlet leading to an inlet valve chamber which is in communication with two separate treatment chambers, both of which are connected to an outlet through an outlet valve chamber. In the disclosed structure a spool valve is provided in the inlet valve chamber for directing fluid flow through one or the other of the treatment chambers while in the outlet valve chamber a double-acting check valve is provided which closes off the fluid treatment chamber through which there is no flow. The treatment chamber contains replaceable anodes of a metal such as magnesium which are in electrical contact with the housing.

BACKGROUND OF THE INVENTION

The present invention pertains to the field of self-energizing electrolytic water treatment. At times such treatment is referred to as water correction. The general principals of treatment processes of this type are considered to be well established even though the reactions which take place in water treatment or correction of this type are not considered to be completely understood or defined. The important thing is that this type of water treatment is well established to have a beneficial result in maintaining the fluid quality in a piping system and in maintaining the condition of the pipe within such a system.

In self-energizing electrolytic water treatment, the water being treated is caused to flow in a treatment housing or structure past an anode structure. Generally the anode structure is used either with a separate cathode structure so as to be electrically connected to such a cathode structure or the anode strucutre is electrically connected to the treatment housing and/or connected to the piping so either or both of these can serve as a cathode. In this type of treatment or conditioning, the anode used is what may be referred to as a "sacrificial" anode. Such anodes are consumed as water flows past them at rates which are dependent upon a number of different factors.

An understanding of the present invention does not require a detailed understanding of the mechanism by which self-energizing electrolytic water treatment operates. The present invention is primarily concerned with equipment to be used with this type of water treatment. It is considered that prior structures for use in this type of water treatment have tended to be unnecesarily complex and expensive to manufacture, have frequently not been overly effective in terms of their size, and have frequently been of such a character as to be difficult and undesirable to use because of the problem of replacing or servicing the anodes employed in them.

SUMMARY OF THE INVENTION

An objective of the present invention is to provide new and improved water treatment apparatus which overcomes various limitations and disadvantages of prior art related equipment such as the limitations and disadvantages indicated in the preceding discusison. It is not to be assumed, however, that the water treatment apparatus of the invention is limited solely to self-energizing electrolytic water treatment applications. With minimal changes or modifications within the scope of routine skill in the fields of fluid treatment a water treatment apparatus as disclosed herein can be employed for a variety of different, diverse purposes. It is considered, however, that an apparatus of the present invention is especially suitable and desirable for use in water treatment as indicated.

Further objectives of the present invention are to provide new and improved treatment apparatus as indicated which is relatively easy to manufacture, which can be manufactured comparatively inexpensively, which is capable of giving prolonged, reliable service, which will require a minimum of maintenance and repair, which will perform satisfactorily for its intended purpose. A further related objective is to provide an aparatus as described which may be utilized in such a manner that it may be serviced without there being any necessity for stopping the use of the apparatus. This latter is considered quite important.

In accordance with this invention, these objectives of the invention are achieved in a fluid treatment structure in which a housing including an inlet, an inlet valve chamber, two treatment chambers, an outlet valve chamber and an outlet is used with an inlet valve means located within the inlet valve chamber, an outlet valve means located within the outlet valve chamber, and fluid treatment means located within each of the treatment structures. Appropriate openings leading between the various parts of the housing are, of course, employed.

With a structure such as this, by the manipulation of the inlet valve means, fluid may be directed so as to flow through either of the treatment chambers to the outlet of the complete structure. Such fluid flowing through either of these chambers is prevented from entering the other of the chambers by means of an outlet valve means. As a consequence of this, the treatment chamber through which there is no flow may be opened for servicing, inspection or the like, while the complete structure is used for its intended purpose by flow through one of the treatment chambers.

BRIEF DESCRIPTION OF THE DRAWING

The invention is best more fully explained with reference to the accompanying drawing in which:

FIG. 1 is a side-elevational view of a presently preferred embodiment or form of a water treatment apparatus of this invention;

FIG. 2 is a partial cross-sectional view of this apparatus taken along the line 2—2 in FIG. 1;

FIG. 3 is an enlarged, fragmentary, cross-sectional view showing the construction of and operation of the preferred outlet valve means employed in the apparatus;

FIG. 4 is an enlarged, fragmentary, cross-sectional view showing the construction of a part of a valve spool employed in the preferred inlet valve means employed with this apparatus; and FIG. 5 is an enlarged partial cross-sectional view taken at line 5—5 of FIG. 2.

From a careful consideration of the drawing it will be realized that the water treatment apparatus illustrated in it is a specific structure embodying or utilizing the principals or concepts of this invention as are set forth and defined in the appended claims forming a part of this disclosure. These principals or concepts may, of course, be embodied within other somewhat differently constructed and somewhat differently appearing apparatuses than the specific apparatus illustrated and described herein through the use or exercise of routine engineering skill.

DETAILED DESCRIPTION OF THE PREFERRED EMBODIMENT

In the drawing there is shown a fluid or water treatment apparatus 10 in accordance with this invention which includes a housing 12 formed by appropriate conventional fabrication techniques so as to include an inlet 14 adapted to be connected to a conventional water line (not shown) in a conventional manner. This inlet 14 has an opening 16 leading to an inlet valve chamber 18 which is in turn connected by two other openings 20 to two, separate rectilinear treatment chambers 22. These treatment chambers 22 have a common wall 24. The extremities of these treatment chambers 22 remote from the openings 20 are provided with other openings 26 leading into an outlet valve chamber 28. This outlet valve chamber 28 is connected by way of a further opening 30 to a conventional outlet 32 which, like the inlet 14, is adapted to be connected to conventional piping (not shown).

The inlet chamber 18 is provided with two cylindrical valve seats 34, each of which is located between the opening 16 and one of the openings 20. These valve seats 34 form a part of an inlet valve 36 which is adapted to be utilized in directing flow from the inlet 14 into either of the chambers 22. This valve 36 includes a centrally located shaft 38 extending completely across the inlet chambers 18 in such a manner that it is mounted in a hole 40 formed in the housing 12 and in another hole 42 centrally located within a closure plug 44 threadably attached to the housing 12 so as to form a part of this housing 12. Preferably, a small conventional seal ring 46 is used to prevent leakage between the plug 44 and the housing 12.

With this structure the extremity of the shaft 38 on the exterior of the plug 44 carries a handle 48 which can be rotated so as to turn this shaft 38. During the use of the handle 48 accidental or unintentional dislodgment of the shaft 38 is prevented by means of a small snap collar retainer 50. This retainer 50 is of a conventional construction and fits within a groove (not shown) in the shaft 38. It is noted that the handle 48 abuts against the plug 44 and that the retainer 50 fits against the housing 12 in such a manner as to prevent shifting of the shaft 38.

When the handle 48 is turned the rotation of the shaft 38 is transferred by external threads 52 to internal threads 54 in the cylindrical interior 56 of a valve spool 58 serving as a valve body. This valve spool 58 has cylindrical ends 60 which are adapted to fit within the valve seats 34 so as to seal these seats 34. Preferably other conventional seal rings 46 are used on these cylindrical ends 60 as shown. It will be noted that the ends 60 are spaced from one another a distance such that, when one of the ends 60 is within one of the valve seats 34 the other of the ends 60 is within a recess 62 in the inlet chamber 18 on the far side of the chamber 18 remote from the valve seat 34 which is closed off. With this structure by turning the handle 48 the valve spool 58 may be moved back and forth so as to direct a fluid passing through the inlet 14 into either of the treatment chambers 22.

While the inlet valve 36 is being actuated so that the spool 58 is in other than either of its extreme positions fluid will, of course, flow to both of the treatment chambers 22. At times this is considered to be advantageous. During movement of the valve spool 58 between its extreme positions, the pressures on the cylindrical ends 60 are preferably equalized by means of a small passage 64 placing the ends of the inlet chamber 18 in communication with one another. Adjacent to the plug 44 this passage 64 is in communication with holes 66 in a tubular extension 68 extending from the plug 44 so as to stabilize and provide a guide for movement of the valve spool 58.

The outlet valve chamber 28 is closed off by means of a threaded plug 70 which roughly corresponds to the plug 44. This plug 70 is adapted to be sealed relative to the housing 12 by means of other sealing rings 46. This plug 70 carries a cylindrical wall 72 terminating in an internal valve seat 74 facing another similarly formed valve seat 76 in the chamber 28. This wall 72 also is provided with an opening 78 which is in alignment with one of the openings 26. The plug 70 also carries an extending pin 80 which extends along the axis of the valve seats 74 and 76.

These vave seats 74 and 76 and the pin 80 form a part of a double-acting outlet valve 82. This valve 82 also includes a first valve body 84 having a cylindrical center section 86 slidably mounted on the pin 80. This valve body 84 is adapted to seat against the valve seat 76 in an established manner as hereinafter indicated. Surrounding and slidably mounted upon the cylindrical center section 86 is another cylindrical center section 88 of a second valve body 90. This second valve body 90 is adapted to fit against and form a seal with the valve seat 74.

Preferably a conventional seal ring 46 is located between the sections 86 and 88 as shown. A coil spring 92 is located around the sections 86 and 88 so as to tend to bias both of the valve bodies 84 and 90 apart so that the seats 74 and 76 are closed off. With this structure in effect the pin 80 acts as a stabilizer permitting movement of the valve bodies 84 and 90 relative to one another and relative to this pin 80. Inasmuch as the second valve body 90 is carried by the cylindrical center section 86 of the first valve body 84, this second valve body 90 is indirectly carried by and stabilized by the pin 80.

In the apparatus 10 illustrated the treatment chambers 22 contain stacks of individual corrugated plate anodes 94 in which the corrugations extend generally between the openings 20 and 26 so as to permit fluid flow with a minimum pressure drop through these chambers 22. The anodes 94 are provided with holes 96 which are traversed by bolts 98. These bolts 98 extend through holes 100 in closures 102 and through the holes 96 to internally threaded bosses 104 located within the treatment chambers 22. Preferably conventional sealing washers 106 are located between the heads 108 of the bolts 98 and the closures 102 in order to prevent leakage. Preferably a conventional gasket 110 is located so as to prevent leakage out from under the closures 102. With the structure shown the anodes 94 fit closely against with respect to the bolts 98 so as to be in electrical contact with them and these bolts 98 are in electrical communication with the housing 12.

In the apparatus 10 as used for a so-called "self-energizing" electrolytic water treatment the anodes 94 are preferably of a metal such as magnesium or a magnesium alloy. If desired, however, these anodes 94 may be formed out of other related metals such as zinc or aluminum or the like recognized in the art as being somewhat equivalent to magnesium as anode metals. In the apparatus 10 used for such treatment the housing 12 and all other parts of the valve 10 shown and described except for the sealing structures employed are preferably formed out of a conventional iron or iron alloy as commonly used for iron or steel valve castings. It is preferred that the apparatus 10 be formed of materials as indicated because of the cost and effectiveness of such materials. The housing 12 and other parts except for the anodes 94 can, of course, be formed out of other metals or alloys recognized to performing as somewhat equivalent of iron in the apparatus 10. The parts of the apparatus 10 other than indicated specifically in this paragraph may be formed of an appropriate, conventional inert material.

During the use of the apparatus 10 the inlet valve 36 is preferably adjusted through the use of a handle 48 so that water will flow to one or the other of the treatment chambers 22 as indicated. The pressure of such flow will, of course, open the outlet valve 82, since this outlet valve 82 is in effect a double-acting, spring loaded check valve. By virtue of the construction and operation of the valves 36 and 82, the apparatus 10 will be normally operated so that there is no flow through one of the treatment chambers 22 when there is flow through the other of the treatment chambers 22. By changing the position of the inlet valve 36 from one extreme position of the handle 48 to the other it is possible to first isolate one of the treatment chambers 22 and then the other as required or desired. As a consequence of this an isolated treatment chamber 22 may be opened through the use of the bolts 98 for inspection and servicing of the anodes 94 within it as desired or required during the use of the apparatus 10.

Normally the apparatus 10 will be operated so only one of the treatment chambers 22 will contain flowing fluid at a time. If desired, however, so as to obtain maximum fluid contact with the anodes 94, the handle 48 may be positioned so that the valve spool 58 is located midway between its two extreme positions. When the inlet valve 36 is in this "in between" position there will be flow through both of the treatment chambers 22.

I claim:

1. A fluid treatment structure which includes:

a housing formed so as to include an inlet, an inlet valve chamber, two treatment chambers, an outlet valve chamber and an outlet, said housing having openings extending between said inlet and said inlet valve chamber, between said inlet valve chamber and each of said treatment chambers, between said treatment chambers and said outlet valve chamber and between said outlet valve chamber and said outlet, inlet valve means located within said inlet valve chamber for controlling fluid flow from said inlet into either of said treatment chambers, said inlet valve means being capable of being actuated from the exterior of said housing, outlet valve means located within said outlet valve chamber, said outlet valve means being operative to prevent the flow of fluid into a chamber through which no fluid is flowing because of the position of said inlet valve means, each of said treatment chambers including closure means for providing access to the interior thereof from the exterior of said housing, fluid treatment means comprising anodes located within the interiors of each of said treatment chambers, said fluid treatment means being positioned so as to be engaged by fluid flowing through said treatment chamber.

2. A fluid treatment structure as claimed in claim 1 wherein:

said valve chamber includes valve seats forming a part of said inlet valve means located between said openings from said inlet valve chamber to said treatment chamber and said opening from said inlet to said inlet valve chamber and, said inlet valve means includes said valve seats and a valve body capable of being moved between two positions in which said valve body fits against either of said seats, and said outlet valve means comprises check valve means responsive to fluid pressure.

3. A fluid treatment structure as claimed in claim 1 wherein:

said inlet valve chamber includes two aligned cylindrical valve seats forming a part of said inlet valve means, said valve seats being located between said openings from said inlet valve chamber to said treatment chambers and said opening from said inlet to said inlet valve chamber, said inlet valve means also including shaft means extending across said inlet valve chamber along the axis of said valve seats, said shaft means extending to the exterior of said housing, said inlet valve means also including a valve spool having cylindrical ends capable of fitting within said cylindrical valve seats so as to prevent fluid flow through said valve seats, said valve spool being operatively connected to said shaft so that upon rotation of said shaft said valve spool is moved so that said cylindrical valve seats will be selectively closed off, said inlet valve means also including means for actuating said shaft means so as to move said valve spool, said outlet valve means comprises double-acting check valve means responsive to fluid pressure located within said outlet valve means so as to be capable of automatically blocking fluid flow to either of said treatment chambers as fluid flows through the other of said treatment chambers in accordance with the position of said valve spool of said inlet valve means.

4. A fluid treatment structure as claimed in claim 3 wherein:

said outlet valve means includes valve seats forming a part of said outlet valve chamber located between the openings from said treatment chambers to said outlet valve chamber and the opening from said outlet valve chamber to said outlet, said outlet valve means also including a stablizer extending into said outlet chamber, a first valve body slidably mounted on said stabilizer so as to be capable of being moved relative thereto, a second valve body slidably mounted on said stabilizer so as to be capable of being moved relative thereto, said valve bodies being capable of being moved so as to close off said valve seats in said outlet chamber and spring means biasing said valve bodies away from one another.

5. A fluid treatment structure as claimed in claim 4 wherein:

said second valve body is slidably mounted on said stablizer by being slidably mounted on a portion of said first valve body and wherein, said spring means is a coil spring located between said two valve bodies.

6. A fluid treatment structure as claimed in claim 1 wherein:

said anodes comprise a plurality of separate, discreet anode members positioned within said treatment chambers so that a fluid may flow past said anode members in fluid contact with said anode members, said closure means comprising lids and bolts engaging said lids and extending through said treatment chambers into threaded engagement with said housing, said bolts being in electrical contact with said anode members and said housing, said housing and said bolts being of a different metal than said anode members.

7. A fluid treatment structure as claimed in claim 6 wherein:

said anode members are corrugated plates and wherein said plates are located so that the corrugations thereof extend generally in the direction of fluid flow in said chambers.

8. A fluid treatment structure as claimed in claim 6 wherein:

said anode members are electrically connected to said housing through said bolts.

9. A fluid treatment structure as claimed in claim 1 wherein:

said valve chamber includes valve seats forming a part of said inlet valve means located between said openings from said inlet valve chamber to said treatment chamber and said opening from said inlet to said inlet valve chamber and, said inlet valve means includes said valve seats and a valve body capable of being moved between two positions in which said valve body fits against either of said seats, and said outlet valve means comprises check valve means responsive to fluid pressure, said anodes comprise a plurality of separate, discreet anode members positioned within said treatment chambers so that a fluid may flow past said anode members in fluid contact with said anode members, said closure means comprising lids and bolts engaging said lids and extending through said treatment chambers into threaded engagement with said housing, said bolts being in electrical contact with said anode members and said husing, said housing and said bolts being of a different metal than said anode members, said anode members are corrugated plates and wherein said plates are located so that the corrugations thereof extend generally in the direction of fluid flow in said chambers.

10. A fluid treatment structure as claimed in claim 1 wherein:

said inlet valve chamber includes two aligned cylindrical valve seats forming a part of said inlet valve means, said valve seats being located between said openings from said inlet valve chamber to said treatment chambers and said opening from said inlet to said inlet valve chamber, said inlet valve means also including shaft means extending across said inlet valve chamber along the axis of said valve seats, said shaft means extending to the exterior of said housing, said inlet valve means also including a valve spool having cylindrical ends capable of fitting within said cylindrical valve seats so as to prevent fluid flow through said valve seats, said valve spool being operatively connected to said shaft so that upon rotation of said shaft said valve spool is moved so that said cylindrical valve seats will be selectively closed off, said inlet valve means also including means for actuating said shaft means so as to move said valve spool, said outlet valve means comprises double-acting check valve means responsive to fluid pressure located within said outlet valve means so as to be capable of automatically blocking fluid flow to either of said treatment chambers as fluid flows through the other of said treatment chambers in accordance with the position of said valve spool of said inlet valve means, said outlet valve means includes valve seats forming a part of said outlet valve chamber located between the openings from said treatment chambers to said outlet valve chamber and the opening from said outlet valve chamber to said outlet, said outlet valve means also including a stabilizer extending into said outlet chamber, a first valve body slidably mounted on said stabilizer so as to be capable of being moved relative thereto, a second valve body slidably mounted on said stabilizer so as to be capable of being moved relative thereto, said valve bodies being capable of being moved so as to close off said valve seats in said outlet chamber and spring means biasing said valve bodies away from one another, said second valve body is slidably mounted on said stabilizer by being slidably mounted on a portion of said first valve body and wherein, said anodes comprise a plurality of separate, discreet anode members positioned within said treatment chambers so that a fluid may flow past said anode members in fluid contact with said anode members, said closure means comprising lids and bolts engaging said lids and extending through said treatment chambers into threaded engagement with said housing, said bolts being in electrical contact with said anode members and said housing, said housing and said bolts being of a different metal than said anode members, said anode members are corrugated plates and wherein said plates are located so that the corrugations thereof extend generally in the direction of fluid flow in said chambers, said anode members are electrically connected to said housing through said bolts.

References Cited

UNITED STATES PATENTS

| 719,471 | 2/1903 | Kaiser | 204—149 |
|---|---|---|---|
| 2,358,981 | 9/1944 | Lattner | 204—197 |
| 2,524,511 | 10/1950 | Butler | 204—248 |
| 3,342,712 | 9/1967 | O'Keefe | 204—248 |

TA-HSUNG TUNG, Primary Examiner

U.S. Cl. X.R.

137—599; 204—148, 150, 248